United States Patent [19]
Rossbach et al.

[11] Patent Number: 5,765,221
[45] Date of Patent: Jun. 9, 1998

[54] METHOD AND SYSTEM OF ADDRESSING WHICH MINIMIZE MEMORY UTILIZED TO STORE LOGICAL ADDRESSES BY STORING HIGH ORDER BITS WITHIN A REGISTER

[75] Inventors: Paul Charles Rossbach; Chin-Cheng Kau; David Stephen Levitan, all of Austin, Tex.

[73] Assignees: International Business Machines Corporation, Armonk, N.Y.; Motorola, Inc., Schaumburg, Ill.

[21] Appl. No.: 767,568

[22] Filed: Dec. 16, 1996

Related U.S. Application Data

[63] Continuation of Ser. No. 319,330, Oct. 5, 1994, abandoned.
[51] Int. Cl.⁶ .................................................. G06F 12/04
[52] U.S. Cl. ................................................ 711/220
[58] Field of Search ................ 395/421.1; 711/220, 711/201, 212, 2

[56] References Cited

U.S. PATENT DOCUMENTS

| | | | |
|---|---|---|---|
| 4,240,139 | 12/1980 | Fukuda et al. | 711/215 |
| 4,251,860 | 2/1981 | Mitchell et al. | 711/220 |
| 4,449,184 | 5/1984 | Pohlman et al. | 711/2 |
| 4,839,856 | 6/1989 | Tanaka | 711/211 |
| 4,969,086 | 11/1990 | Pfeiffer et al. | 711/220 |
| 5,142,636 | 8/1992 | Itoh | 711/220 |
| 5,386,523 | 1/1995 | Crook et al. | 711/220 |
| 5,524,228 | 6/1996 | Maruyama et al. | 711/220 |

FOREIGN PATENT DOCUMENTS

| | | |
|---|---|---|
| 0 297 893 | 1/1989 | European Pat. Off. . |
| 0 614 137 A2 | 9/1994 | European Pat. Off. . |
| WO 83/00241 | 1/1983 | WIPO . |

OTHER PUBLICATIONS

Uffenbeck, John E. Microcomputers and Microprocessers: The 8080, 8085, and Z-80 Programming, Interfacing, and Troubleshooting. Prentice-Hall, Inc. p. 576. Dec. 1985.

Patterson, David A. and John L. Hennessy. Computer Architecture: A Quantitative Approach. Morgan Kaufmann Publishers, Inc. pp. 153–159. Dec. 1990.

Lindsay, Jon. CP/M-86 Assembly Language Programming. Brady Communications Company. pp. 8–10. Dec. 1986.

iAPX 86, 88 User's Manual. Intel Corporation. pp. 2–11—2–13. Aug. 1991.

*Primary Examiner*—Eddie P. Chan
*Assistant Examiner*—Kevin Verbrugge
*Attorney, Agent, or Firm*—Brian F. Russell; Andrew J. Dillon

[57] ABSTRACT

An improved method of addressing within a pipelined processor having an address bit width of m+n bits is disclosed, which includes storing m high order bits corresponding to a first range of addresses, which encompasses a selected plurality of data executing within the pipelined processor. The n low order bits of addresses associated with each of the selected plurality of data are also stored. After determining the address of a subsequent datum to be executed within the processor, the subsequent datum is fetched. In response to fetching a subsequent datum having an address outside of the first range of addresses, a status register is set to a first of two states to indicate that an update to the first address register is required. In response to the status register being set to the second of the two states, the subsequent datum is dispatched for execution within the pipelined processor. The n low order bits of the subsequent datum are then stored, such that memory required to store addresses of instructions executing within the pipelined processor is thereby decreased.

20 Claims, 4 Drawing Sheets

METHOD AND SYSTEM OF ADDRESSING WHICH MINIMIZE MEMORY UTILIZED TO STORE LOGICAL ADDRESSES BY STORING HIGH ORDER BITS WITHIN A REGISTER

This is a continuation of application Ser. No. 08/319,330, filed Oct. 5, 1994, now abandoned.

BACKGROUND OF THE INVENTION

1. Technical Field

The present invention relates in general to an improved method and system of addressing within a data processing system, and in particular to an improved method and system of addressing within a processor having an address bit width of m+n bits utilizing address registers that are less than m+n bits wide. Still more particularly, the present invention relates to an improved method and system of addressing which stores in an address register m high order bits corresponding to a range of addresses within memory containing a plurality of data executing within a processor.

2. Description of the Related Art

In the design of computer systems, a variety of different design techniques are utilized to enhance performance. These design techniques include increasing the data and address bit width of the processor, reducing the instruction set of the processor, and executing instructions within the processor in a pipelined fashion. Currently, many computer architectures utilize 64-bit addressing since it provides a vastly larger address space and greater throughput than conventional 32-bit addressing. Understandably, in computer architectures incorporating both 64-bit addressing and pipelined execution, performance is greatly enhanced.

However, operating a processor in a pipelined fashion entails the additional requirement of tracking the execution of instructions within the processor by storing their associated addresses in buffers and stacks. In 64-bit processors, the processor chip area required for the address buffers and stacks utilized to track the execution of instructions becomes quite large. Since the cost of processor chips increases concomitantly with increased chip area, 64-bit pipelined processors utilizing conventional addressing techniques are considerably more expensive than 32-bit processors.

Consequently, it would be desirable to have a method and system of addressing within a 64-bit pipelined processor which minimizes the required processor chip area by utilizing addressing elements that are less than 64-bits.

SUMMARY OF THE INVENTION

It is therefore one object of the present invention to provide an improved method and system of addressing within a data processing system.

It is another object of the present invention to provide an improved method and system for addressing within a processor having an address bit width of m+n bits utilizing address registers that are less than m+n bits wide.

It is yet another object of the present invention to provide an improved method and system of addressing which stores in an address register m high order bits corresponding to a range of addresses containing a plurality of data executing within a processor.

The foregoing objects are achieved as is now described. An improved method of addressing within a pipelined processor having an address bit width of m+n bits is disclosed, which includes storing m high order bits corresponding to a first range of addresses, which encompasses a selected plurality of data executing within the pipelined processor. The n low order bits of addresses associated with each of the selected plurality of data are also stored. After determining the address of a subsequent datum to be executed within the processor, the subsequent datum is fetched. In response to fetching a subsequent datum having an address outside of the first range of addresses, a status register is set to a first of two states to indicate that an update to the first address register is required. In response to the status register being set to the second of the two states, the subsequent datum is dispatched for execution within the pipelined processor. The n low order bits of the subsequent datum are then stored, such that memory required to store addresses of instructions executing within the pipelined processor is thereby decreased.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
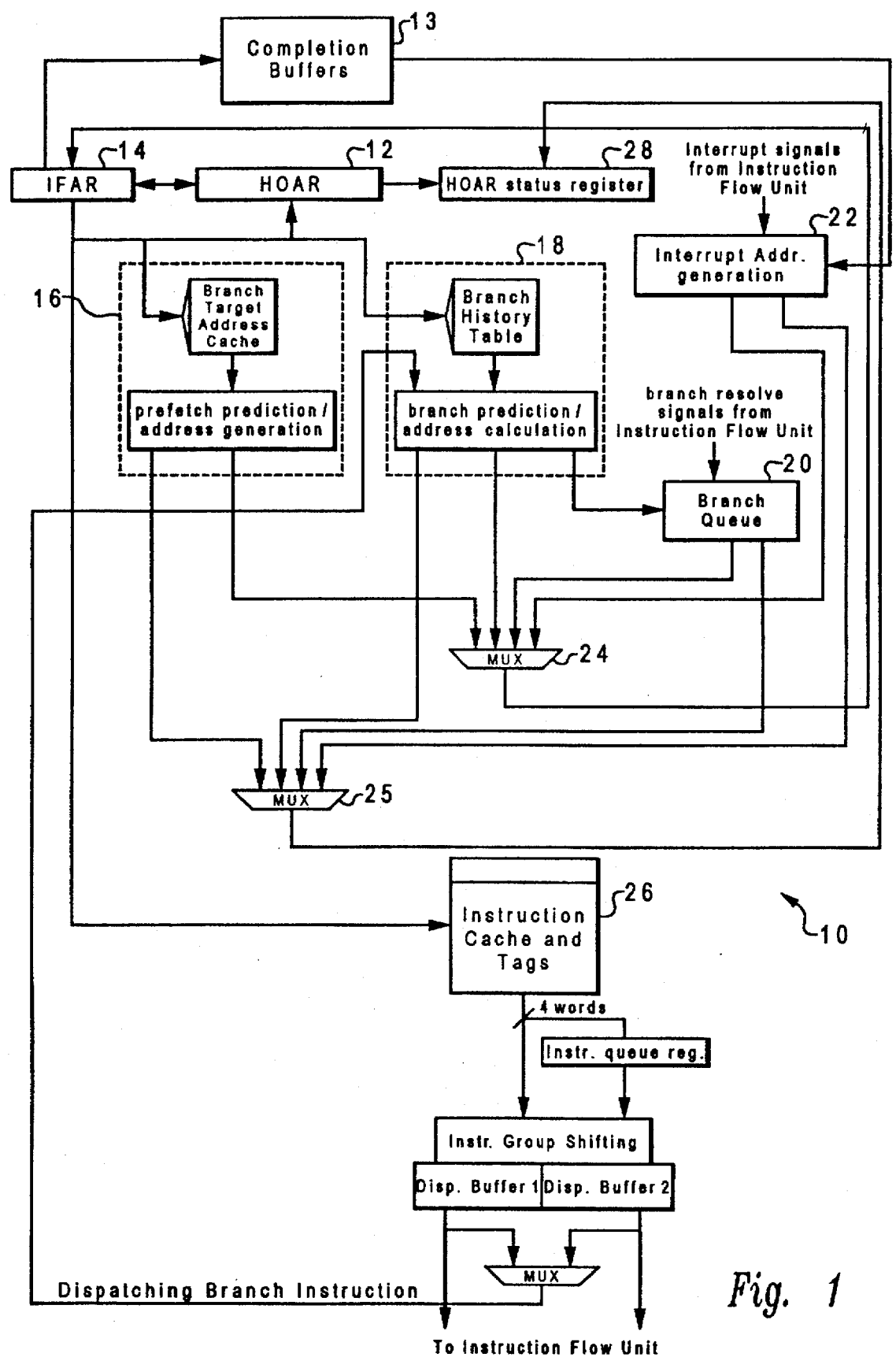
FIG. 1 illustrates a block diagram of the instruction processing unit of a processor utilizing the method and system of the current invention.

With reference now to the figures, and in particular with reference to FIG. 1, there is illustrated a block diagram of the instruction processing unit of a 64-bit pipelined processor utilizing the method and system of the present invention. The present invention takes advantage of the locality of addresses within instruction cache 26 to reduce the processor chip area required by instruction processing unit 10. The locality of instruction addresses enables HOAR 12 to store the 32 high order bits of all instructions executing within the processor. Therefore, instructions within the processor's pipeline of execution may be tracked by storing only the 32 low order bits of the instruction addresses in completion buffers 13, which are 32-bit buffers. The use of 32-bit rather than 64-bit buffers to store instruction addresses reduces the overall size, and therefore cost, of the processor chip. The processor chip area required for instruction processing unit 10 is further minimized by utilizing 32-bit rather than 64-bit adders to calculate relative instruction addresses.

As illustrated, instruction processing unit 10 is comprised of High Order Address Register (HOAR) 12, instruction Fetch Address Register (IFAR) 14, prefetch unit 16, dispatch unit 18, resolve unit 20, completion unit 22, and multiplexers 24 and 25.

Prefetch unit 16, dispatch unit 18, resolve unit 20, and completion unit 22 represent four stages in the instruction processing pipeline of instruction processing unit 10. In a given cycle, each of these units may generate an instruction fetch request. The highest priority instruction fetch request during a given cycle is multiplexed to IFAR 14 by multiplexer 24. The address multiplexed to IFAR 14 is associated with the oldest instruction in the instruction pipeline which stimulates an instruction fetch. An instruction will initiate a fetch if the next instruction that is to be executed has not yet been fetched. Thus, instruction fetch requests are prioritized such that if a branch prediction by dispatch unit 18 causes an instruction fetch, then the address generated by prefetch unit 16 is ignored. Similarly, if an instruction fetch results from, a branch being resolved by resolve unit 20 as guessed wrong, then all prefetch and branch prediction addresses generated by prefetch unit 16 and dispatch unit 18 are ignored. Finally, if an interrupt is generated by completion unit 22 all other instruction fetch requests are ignored, and the interrupt address is multiplexed to IFAR 14.

When the processor is operating in its standard 64-bit mode, the instruction fetch address multiplexed to IFAR 14 is a 64-bit address, of which 62 bits access the current instruction word in instruction cache 26. A preferred embodiment of a processor utilizing the present invention also supports a 32-bit addressing mode, which utilizes only the 32 low order bits of instruction addresses. When operating in 32-bit mode, HOAR 12, which stores the 32 high order bits of all instructions executing within the processor, is set to 0.

If IFAR 14 latches an instruction fetch address outside of the contiguous four gigabyte address space specified by HOAR 12, HOAR 12 must be updated with the 32 high order bits of the new address before the instruction is executed. When a HOAR update is required, HOAR status register 28 is set to indicate both that an update is necessary and what type of update will be made. When HOAR status register 28 is set, the processor must drain (i.e., complete execution of instructions currently in the processor), before the HOAR update can occur. Since this penalty is normally only a few cycles, and occurs infrequently, performance degradation is minimized. The processes followed by instruction processing unit 10 to select instruction fetch addresses and to manage updates to HOAR 12 will now be described in greater detail with reference to FIGS. 2 and 3.

Figure 2:
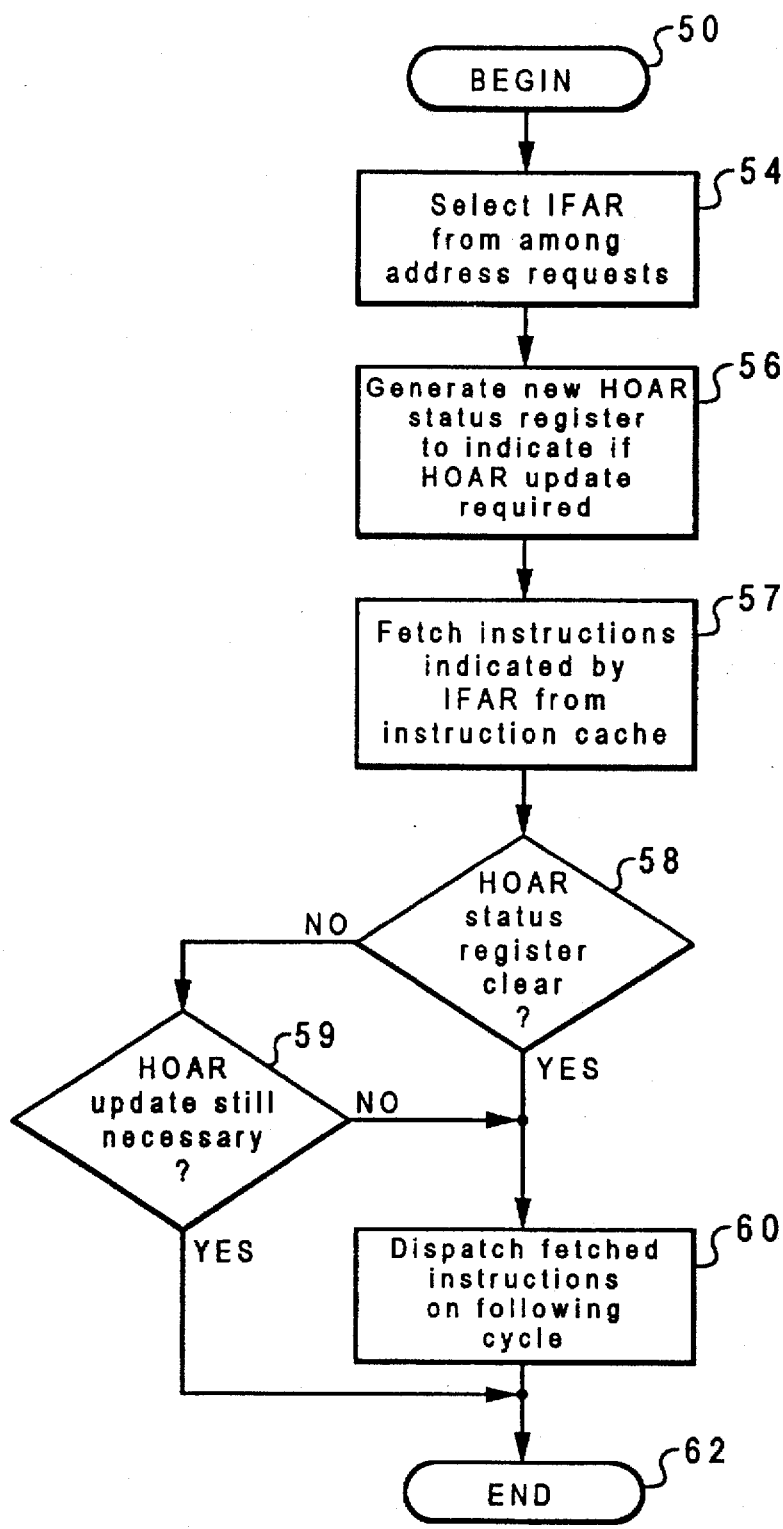
FIG. 2 depicts a flowchart of a process utilized by the instruction processing unit illustrated in FIG. 1 to determine the address of a subsequent instruction.

Referring now to FIG. 2, there is depicted a flowchart of the process utilized each cycle by instruction processing unit 10 to generate instruction fetch addresses. As the process begins in block 50, the 32 high order bits of instructions within the processor's pipeline of execution are stored within HOAR 12. As illustrated, the process proceeds to block 54, which depicts selecting an instruction fetch address from among the address requests present at multiplexer 24. As described above, multiplexer 24 selects the highest priority (i.e., the oldest) instruction fetch request present.

Thereafter, the process proceeds to block 56, which illustrates generating a new HOAR status register value to indicate that a HOAR update is required if the 32 high order bits of the new instruction fetch address within IFAR 14 differ from the 32 high order bits stored within HOAR 12. Prefetch unit 16, dispatch unit 18, resolve unit 20, and completion unit 22 each have five status bits which indicate the type of update to HOAR 12 required if the address fetch request generated by that unit is selected by multiplexer 24. If an address request does not require a HOAR update, the status bits associated with the address request indicate a clear status. As illustrated in FIG. 1, these status values are input to multiplexer 25. The status value corresponding to the instruction fetch address selected by multiplexer 24 is multiplexed to HOAR status register 28 upon the selection of an instruction fetch address.

Five types of HOAR updates are possible, depending upon how the address of the subsequent instruction fetch address contained within IFAR 14 was generated. First, HOAR status register 28 may be set to indicate that HOAR 12 should be incremented. HOAR status register 28 is set to indicate that HOAR 12 should be incremented if the subsequent instruction fetch address is determined by either a positive relative branch or a sequential path from the current instruction fetch address. Similarly, HOAR status register 28 may be set to indicate that HOAR 12 should be decremented if the subsequent instruction fetch address is calculated by taking a negative relative branch from the current instruction fetch address. A third state of HOAR status register 28 indicates that HOAR 12 should be updated by loading the 32 high order bits of a 64-bit architected register value which is utilized as the subsequent instruction fetch address. HOAR status register 28 may be set to a fourth or a fifth state when the subsequent instruction fetch address is an absolute branch. When calculating an absolute branch address, the immediate field, which is either a 14 or 20 bit value, is sign-extended to 64 bits, thereby setting the 32 high order bits of IFAR 14 to all 1's or all 0's. Thus, HOAR 12 must be updated to all 1's or all 0's if the subsequent instruction fetch address is an absolute negative branch or an absolute positive branch, respectively, and the HOAR is not already set to the required value.

Once HOAR status register 28 is set to indicate whether a HOAR update is required, the process proceeds from block 56 to block 57, which illustrates fetching the instructions indicated by the instruction fetch address in IFAR 14 from instruction cache 26. Thereafter, the process proceeds to block 58, which depicts determining if HOAR status register 28 is clear (i.e., not set to indicate a HOAR update).

If HOAR status register 28 is set to indicate a HOAR update, the process proceeds to block 59, which illustrates comparing the value of HOAR 12 to the 32 high order bits of IFAR 14 to determine if IFAR 14 has latched a new instruction fetch address which renders the indicated HOAR update unnecessary. For example, if HOAR status register 28 indicates HOAR 12 should be updated by loading the 32 high order bits of a 64-bit architected register value or by setting HOAR 12 to all 1's or all 0's, and HOAR 12 is already set to the required value, the process determines that the fetched instructions may be dispatched, even though HOAR status register 28 may not be cleared until the next cycle. If HOAR status register 28 is clear or the indicated HOAR update is unnecessary, the process proceeds to block 60. Block 60 illustrates dispatching the fetched instruction for execution within the processor. Thereafter, the process terminates at block 62.

If, however, HOAR status register 28 is set and the comparison depicted in block 59 indicates that a HOAR update remains necessary, the process terminates at block 62 without dispatching the fetched instructions. Thus, instructions are fetched speculatively while instructions at addresses within the address space indicated by HOAR 12 remain in the processor's pipeline of execution.

Figure 3:
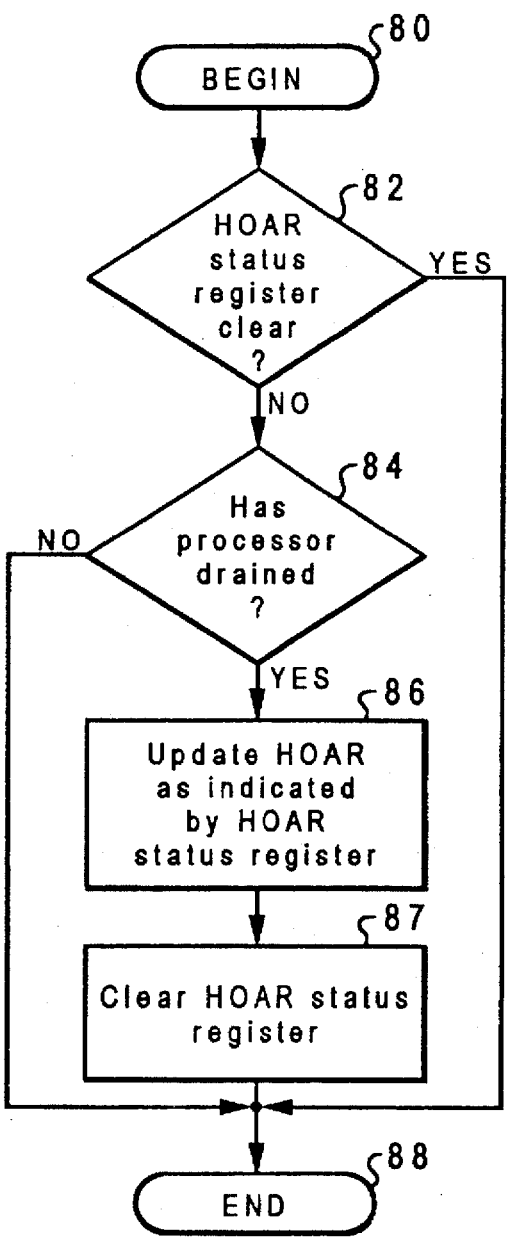
FIG. 3 illustrates a flowchart of a process utilized to update the High Order Address Register (HOAR) depicted in FIG. 1.

With reference now to FIG. 3, there is illustrates a flowchart of a process utilized each cycle by instruction processing unit 10 to manage HOAR status register 28. As illustrated, the process begins in block 80 and thereafter proceeds to block 82, which illustrates determining if HOAR status register 28 is clear. If HOAR status register 28 is clear, the process proceeds to block 88, which depicts terminating the process until the next cycle. However, if HOAR status register 28 has been set to indicate a HOAR update, the process proceeds to block 84.

Block 84 illustrates determining if the processor has drained. If the processor has not drained, the process proceeds to block 88, which depicts terminating the process until the next cycle. If the processor has drained, no instructions which might require the HOAR value remain in the processor's pipeline of execution. Therefore, the process proceeds to block 86, which depicts updating HOAR 12 as indicated by the state of HOAR status register 28. As discussed above, the state of HOAR status register 28 indicates if the HOAR should be incremented, decremented, loaded, set to 1's or set to 0's. The process then proceeds to block 87, which illustrates clearing HOAR status register 28 to indicate that the required HOAR update has been made. Thereafter, the process terminates at block 88.

The processes illustrated in FIGS. 2 and 3 execute concurrently within instruction processing unit 10 and communicate via HOAR status register 28. For example, the process depicted in FIG. 2 may select an instruction fetch address at block 54, which sets HOAR status register 28 to indicate a HOAR update at block 56. If on the subsequent iteration of blocks 54 and 56, HOAR status register 28 is cleared, a HOAR update pending in the process depicted in FIG. 3 is cancelled. Similarly, updating HOAR 12 and clearing HOAR status register 28 at blocks 86 and 87 of FIG. 3 allows instructions to be dispatched to the processor at block 60 of FIG. 2.

Figure 4:
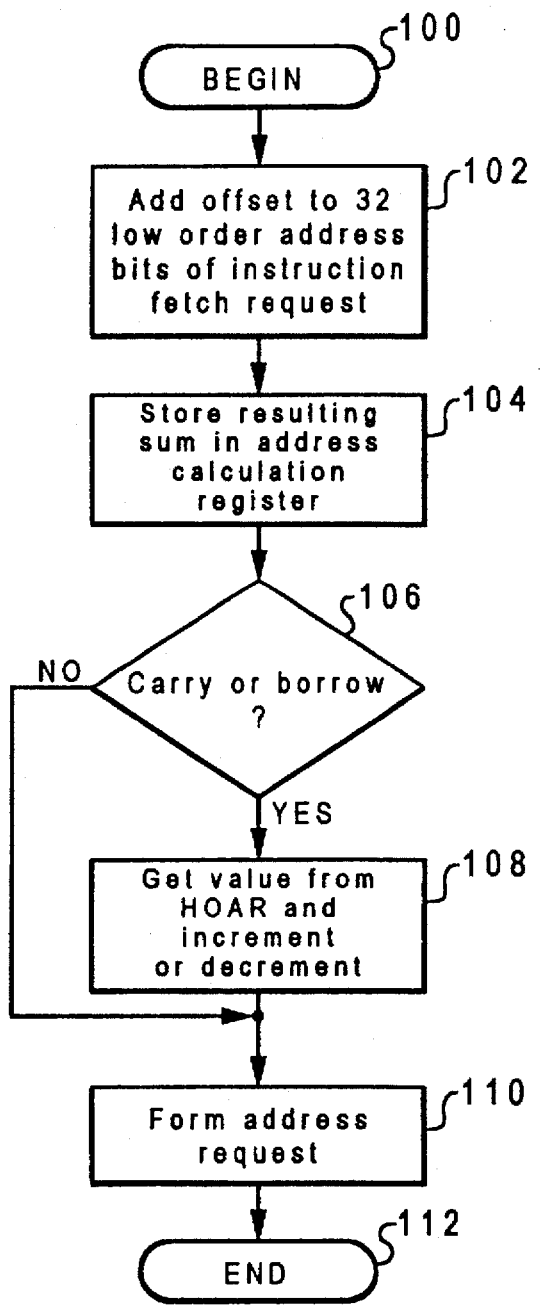
FIG. 4 depicts a flowchart of a process utilized to calculate an address request utilizing an offset from a previous address fetch request.

Referring now to FIG. 4, there is depicted a flowchart of the process utilized by prefetch unit 16, dispatch unit 18, resolve unit 20, completion unit 22 of instruction processing unit 10 to calculate an address request relative to the current instruction fetch address. As briefly mentioned above, when units 16, 18, 20, and 22 calculate address requests relative to the instruction fetch address stored in IFAR 14 utilizing an offset (i.e., the address request is a relative branch or a sequential path from the instruction fetch address), 32-bit adders are utilized. In addition to reducing the chip area required for instruction processing unit 10, the use of 32-bit rather than 64-bit adders enhances processor performance.

As the process begins in block 100, HOAR 12 stores the 32 high order bits of instructions executing within the processor and IFAR 14 stores the current instruction fetch address. As illustrated, the process proceeds from block 100 to block 102, which depicts adding the offset to the 32 low order bits of the instruction fetch address stored in IFAR 14. The sum is then stored in an address calculation register, as illustrated in block 104. Thereafter, the process proceeds to block 106, which depicts determining if the resulting sum created a carry or borrow. If the resulting sum did not create a carry or a borrow, as illustrated by the process proceeding from block 106 to block 110, the address request is formed, as depicted at block 110, by simply concatenating the resulting sum with the 32 high order bits stored in HOAR 12.

If, however, the resulting sum created a carry or a borrow, indicating that the address request is outside of the four gigabyte address space specified by HOAR 12, the process proceeds to block 108. Block 108 illustrates loading the value from HOAR 12, and then incrementing the value if a carry was created or decrementing the value if a borrow was created. Thereafter, the process proceeds to block 110, which depicts concatenating the 32 high order bits, which have been incremented or decremented, with the 32 low order sum bits to form a 64-bit address request. The process then terminates at block 112. The process for calculating address requests depicted in FIG. 4 increases the speed at which addresses are calculated since the manipulation of all 64 address bits is not required in determining an address request.

Although the present invention has been described with reference to a preferred embodiment in which the HOAR stores high order bits of instruction addresses, those skilled in the art will appreciate that a processor could utilize multiple HOARs, including separate HOARs for instruction and data addresses. In addition, those skilled in the art will recognize that the HOAR could store any number of bits which, tend to change infrequently, not just 32 bits. Finally, although a preferred embodiment of the present invention utilizes a 64-bit processor, the present invention may be implemented utilizing a processor having any address bit width.

While the invention has been particularly shown and described with reference to a preferred embodiment, it will be understood by those skilled in the art that various changes in form and detail may be made there in with out departing from the spirit and scope of the invention.

I claim:

1. A method of operating a processor having an execution pipeline and a plurality of completion buffers for tracking instructions in the execution pipeline, said method comprising:

in a first storage location, storing only a first low order portion of a first address associated with a first instruction, wherein said first storage location is a completion buffer among said plurality of completion buffers that stores said first low order portion of said first instruction until said first instruction is retired from execution;

in a second storage location, storing only a second low order portion of a second address associated with a second instruction;

in a third storage location, storing a high order portion of said first and second addresses;

dispatching said first and second instructions, said second instruction being dispatched no earlier than said first instruction and prior to said first instruction being retired from execution;

after dispatching said first instruction, determining a third address utilizing said high order portion in said third storage location and said first low order portion in said first storage location;

after dispatching said second instruction, determining a fourth address utilizing said high order portion in said third storage location and said second low order portion in said second storage location;

after determining said third address, processing said first instruction utilizing said third address; and after determining said fourth address, processing said second instruction utilizing said fourth address.

2. The method of claim 1, wherein said first address is equal to said third address.

3. The method of claim 1, wherein each of said first and second low order portions has n bits, n being a first positive integer.

4. The method of claim 3, wherein said high order portion has m bits, m being a second positive integer.

5. The method of claim 4, wherein each of said third and fourth addresses has a total of at least y bits, wherein y=m+n.

6. The method of claim 4, wherein m=n.

7. The method of claim 1, wherein said first instruction is a branch instruction, and wherein said of determining a third address comprises determining a target address of said branch instruction.

8. The method of claim 1, and further comprising:

concurrently calculating a plurality of potential fetch addresses, wherein at least one of said plurality of potential fetch addresses is calculated utilizing said high order portion stored in said third storage location;

selecting one of said plurality of concurrently calculated potential fetch addresses as an actual fetch address; and fetching contents of a memory location specified by said actual fetch address.

9. The method of claim 8, wherein at least a first potential fetch address among said plurality of potential fetch addresses is calculated utilizing a different high order portion than that stored in said third storage location.

10. The method of claim 9, wherein said first potential fetch address is selected as said actual fetch address, said method further comprising:

updating said third storage location with said different high order portion after said fetching step.

11. A processor, comprising:

an execution pipeline;

a first storage location for storing only a first low order portion of a first address associated with a first instruction, wherein said first storage location is a completion buffer that stores said first low order portion of said first address until said first instruction is retired from execution;

a second storage location for storing a second low order portion of a second address associated with a second instruction;

a third storage location for storing a high order portion of said first and second addresses;

a dispatcher for dispatching said first and second instructions, wherein said second instruction is dispatched no earlier than said first instruction and prior to said first instruction being retired;

means for determining, after dispatching said first instruction, a third address utilizing said high order portion in said third storage location and said first low order portion in said first storage location;

means for determining, after dispatching said second instruction, a fourth address utilizing said high order portion in said third storage location and said second low order portion in said second storage location;

means for processing said first instruction utilizing said third address; and means for processing said second instruction utilizing said fourth address.

12. The processor of claim 11, wherein said first address is equal to said third address.

13. The processor of claim 11, wherein each of said first and second low order portions has n bits, n being a first positive integer.

14. The processor of claim 13, wherein said high order portion has m bits, m being a second positive integer.

15. The processor of claim 14, wherein each of said third and fourth addresses has a total of at least y bits, wherein y=m+n.

16. The processor of claim 14, wherein m=n.

17. The processor of claim 11, wherein said first instruction is a branch instruction, and wherein said means for determining a third address comprises means for determining a target address of said branch instruction.

18. The processor of claim 11, and further comprising:

means for concurrently calculating a plurality of potential fetch addresses, wherein at least one of said plurality of potential fetch addresses is calculated utilizing said high order portion stored in said third storage location;

means for selecting one of said plurality of concurrently calculated potential fetch addresses as an actual fetch address; and means for fetching contents of a memory location specified by said actual fetch address.

19. The processor of claim 18, wherein said means for calculating comprises means for calculating at least a first potential fetch address among said plurality of potential fetch addresses utilizing a different high order portion than that stored in said third storage location.

20. The processor of claim 19, wherein said first potential fetch address is selected as said actual fetch address, said processor further comprising:

means for updating said third storage location with said different high order portion after said fetching step.

* * * * *